(12) United States Patent
Slater et al.

(10) Patent No.: US 12,431,604 B2
(45) Date of Patent: Sep. 30, 2025

(54) WAVEGUIDE AND ELECTROMAGNETIC SPECTROMETER

(71) Applicant: Endress+Hauser Optical Analysis, Inc., Ann Arbor, MI (US)

(72) Inventors: Joseph B. Slater, Dexter, MI (US); Marc Winter, Gelnhausen (DE)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 309 days.

(21) Appl. No.: 18/148,550

(22) Filed: Dec. 30, 2022

(65) Prior Publication Data

US 2024/0222836 A1    Jul. 4, 2024

(51) Int. Cl.
| | |
|---|---|
| *H01P 3/16* | (2006.01) |
| *G02B 6/04* | (2006.01) |
| *H01P 3/10* | (2006.01) |
| *H01P 5/08* | (2006.01) |

(52) U.S. Cl.
CPC ............... *H01P 3/16* (2013.01); *G02B 6/04* (2013.01); *H01P 3/10* (2013.01); *H01P 5/087* (2013.01)

(58) Field of Classification Search
CPC ... H01P 3/16; H01P 3/10; H01P 5/087; G02B 6/04; G02B 6/3668; G02B 6/262; G02B 6/26; G01J 3/0256; G01J 3/0218; G01J 3/02; G01J 3/0205; G01J 3/10; G01J 3/12; G01J 3/18
See application file for complete search history.

(56) References Cited

U.S. PATENT DOCUMENTS

| | | | |
|---|---|---|---|
| 4,952,022 A | 8/1990 | Genovese | |
| 5,953,477 A * | 9/1999 | Wach | G02B 6/4203 |
| | | | 385/115 |
| 12,085,447 B2 * | 9/2024 | Lee | G01J 3/1804 |
| 2009/0040519 A1 | 2/2009 | Zhang | |
| 2012/0081704 A1 | 4/2012 | Morrow et al. | |
| 2015/0077843 A1 | 3/2015 | Huhse | |
| 2022/0350096 A1 | 11/2022 | Goodwill et al. | |

FOREIGN PATENT DOCUMENTS

| | | |
|---|---|---|
| DE | 3644866 A1 | 3/1988 |
| DE | 102020212112 A1 | 3/2022 |
| EP | 1942321 A1 | 7/2008 |

* cited by examiner

*Primary Examiner* — John Bedtelyon
(74) *Attorney, Agent, or Firm* — Gil M. Repa; Endress+Hauser (USA) Holding, Inc.

(57) ABSTRACT

A waveguide for conveying light with an input end and an output end to supply for an electromagnetic spectrometer includes: an input end having a convex envelope of a cross-section of the waveguide at the input end, which envelope defines a circular shape or a shape of a regular polygon with n1 corners, wherein n1 is a natural number bigger than 3; an output end having a cross-section that defines a slit shape; and a plurality of filaments, wherein an arrangement of the plurality of filaments defines the cross-sections at the input and output ends, wherein each filament includes a core and a reflective coating covering a lateral area of the core, wherein the core includes an optically transparent material.

20 Claims, 4 Drawing Sheets

Fig. 1a
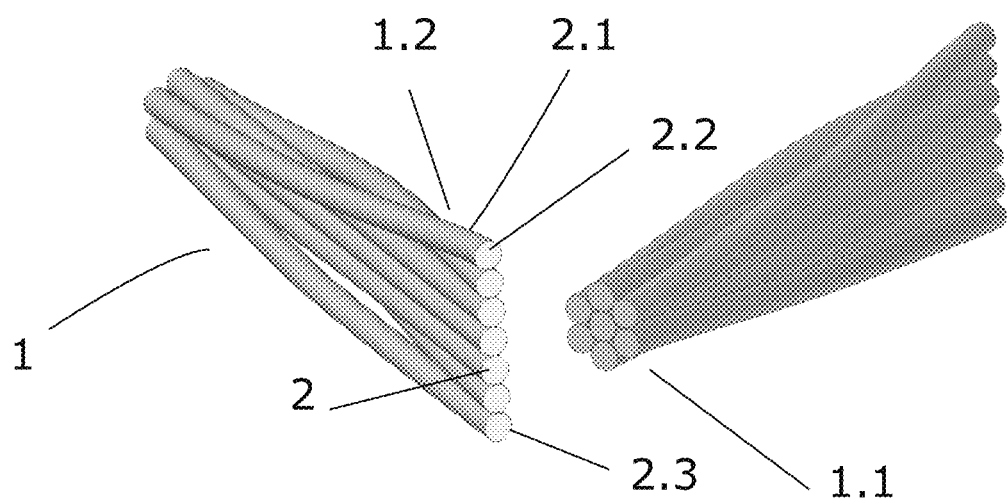
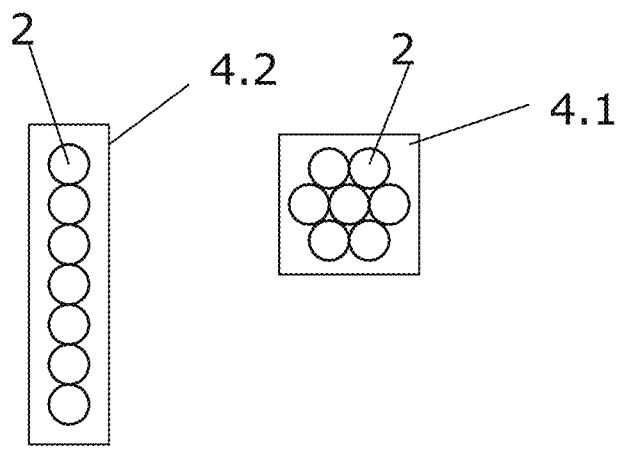
Fig. 1b

WAVEGUIDE AND ELECTROMAGNETIC SPECTROMETER

TECHNICAL FIELD

The present disclosure relates to optical waveguides and electromagnetic spectrometers coupled to such waveguides.

BACKGROUND

Conventional electromagnetic spectrometers use dispersive or diffractive devices for separating light coming from a probe into its spectral components. However, for not wasting spectral resolution, it is necessary that light impinging onto the dispersive or diffractive device is highly collimated. As a preparation for collimation, light stemming from a source may be collected by a round lens, and its cylindrically symmetric energy distribution converted to a slit like energy distribution by an optical arrangement. Such an optical arrangement in the state of the art may comprise a set of optical lenses or fibers, such as shown in US 20220350096 A1, to map the initial energy distribution to a slit-like distribution. However, optical fiber based optical arrangements suffer from a heavy initial loss due to inefficient light in-coupling due to the fact that light within fibers is conveyed only within a fiber core, whereas the cladding, which takes a significant part of the area of a cross section, is rather lossy.

Accordingly, there remains a need for further contributions in this area of technology.

SUMMARY

An object of the present disclosure therefore is to provide an optical arrangement to supply an electromagnetic spectrometer, which has minimized loss and, therefore, increased efficiency. The object is achieved by a waveguide and an electromagnetic spectrometer as claimed according to the present disclosure.

A waveguide according to the present disclosure for conveying light with an input end and an output end to be used for an electromagnetic spectrometer comprises: a plurality of filaments, each configured for conveying electromagnetic waves, such as light, from the input end to the output end, wherein a convex envelope of a cross-section of the waveguide at the input end defines a circular shape or a shape of a regular polygon with n1 corners, wherein n1 is a natural number larger than 3; a cross-section of the waveguide at the output end defines a slit shape, wherein each filament comprises a core and a reflective coating, such as a metallic or dielectric coating covering a lateral area of the core, wherein the core comprises an optically transparent material. Materials for the optically transparent material may be polymers, glasses, crystals or air.

As the core includes a significant part of the area of the overall cross-section of the waveguide, transmission of light is greatly improved compared to conventional optical fibers. As used herein, a filament is a single strand of fiber optic material that may be bundled together to form a fiber optic cable. Materials for the metallic coating may be, for example, gold, silver and aluminum.

In case of a dielectric coating or also a Bragg coating, layers of coating materials with different refractive indices are disposed on top of each other. This leads to a high degree of reflection, at least within a certain range of wavelength. When tuned accordingly, the coating can be implemented for a wavelength of interest.

In an embodiment, a convex envelope of a cross-section of each of the filaments defines a rectangular polygon with n2 corners, wherein n2 is 3, 4 or 6. In that way, the plurality of filaments can be stacked robustly.

In an embodiment, the waveguide comprises two frames, wherein a first frame of the two frames is configured and disposed to position the plurality of filaments at the input end, and wherein a second frame of the two frames is configured and disposed to position the plurality of filaments at the output end. In that way, the filaments maintain their relative position more precisely and more robustly.

In an embodiment, the output end has a length and a width, wherein the width is less than three diameters of one of the filaments. A thin output end improves the possibility to collimate the light.

In an embodiment, at the output end the filaments are arranged as a one-dimensional array. In that way, collimatability is maximized. In an embodiment, the slit shape is linear.

In an embodiment, the output end is configured to be optically connected with an optical lens, wherein the optical lens has a lens refractive index, and wherein a mean refractive index of the filaments differs from a mean of refractive index of air and the lens refractive index by less than 10%.

The index matching reduces losses due to reflection from surfaces between materials of different refractive index. As used herein, the term optical includes also mid-infrared, near-infrared and near-ultraviolet light wavelengths.

In an embodiment, the output end is configured to be optically connected with an optical lens, wherein the optical lens has a lens refractive index, and wherein the filament refractive index varies continuously along the filaments. The index matching reduces losses due to reflection from surfaces between materials of different refractive index.

In at least one embodiment, the optical connection of the output end may include a physical connection configured to facilitate or enable the optical connection.

In an embodiment, the filaments are embedded in a shaping element, which shaping element defines the progression of the filaments from the input end to the output end. In that way, the filaments maintain their position rigidly.

In an embodiment, the filaments and the shaping element are formed by means of additive manufacturing (e.g., 3D printing).

An electromagnetic spectrometer according to the present disclosure comprises: a light source adapted to illuminate a probe with light, wherein the light comprises a spectral line and a line width, wherein a ratio of the line width to a wavelength of the spectral line is less than 1/10000; a collector configured to collect light emitted from the probe as probe light; a waveguide according to the present disclosure; a dispersive or diffractive element configured and arranged to separate probe light transmitted from the probe into its spectral components; a detector configured to detect the spectral components of the probe light; and an optical arrangement comprising an optical lens and a collimating lens, wherein the optical lens is configured to diverge the probe light, wherein the collimating lens is configured to collimate the diverging probe light and to convey the diverging probe light to impinge upon the dispersive or diffractive element, and wherein the waveguide is configured and arranged to convey the probe light from the collector to the optical arrangement.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein:

FIGS. 1a and 1b show an exemplary embodiment of a waveguide according to the present disclosure, including detailed views of input and output ends of the waveguide;

FIG. 3a shows a perspective view of an exemplary waveguide according to the present disclosure;

FIG. 3b shows a detailed view of an inlet end of the waveguide shown in FIG. 3a.

DETAILED DESCRIPTION

FIG. 1a shows an embodiment of a waveguide 1 for conveying light with an input end 1.1 and an output end 1.2 to be used for an electromagnetic spectrometer viewed from a back side and a front side, respectively, according to the present disclosure. The waveguide comprises as, an example, seven filaments 2, which are arranged in a generally circular fashion at the input end 1.1. In that way, the light of a source (not shown) can be captured effectively without excessive losses, as in many cases light distribution from various known sources is roughly cylindrically symmetric. The filaments 2 at the output end 1.2 are arranged such that the intensity distribution of the light being conveyed through and emitted from the waveguide 1 defines a slit. Therefore, the output ends 1.2 of the filaments 2 are arranged generally linearly. In this way, the filaments 2 map the intensity distribution of probe light at the input end 1.1, which is more or less cylindrically symmetric, to an essentially slit-like intensity distribution at the output end 1.2.

Figure 2A:
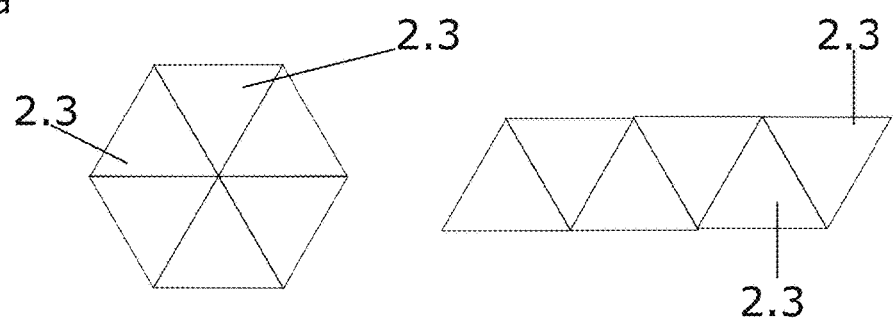
FIGS. 2a-2c show different cross-sections of filaments of embodiments waveguide according to the present disclosure.
Figure 2B:
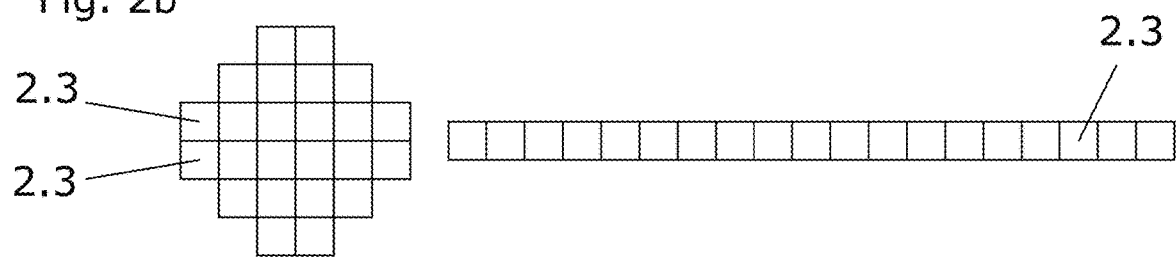
Figure 2C:
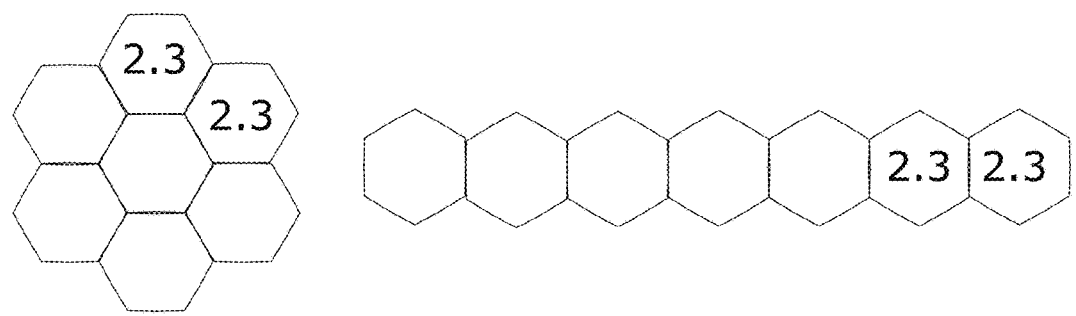

Each of the filaments 2 comprises a core 2.2 made of a polymer, a glass, a crystal or air, for example, and a reflective coating 2.1 covering the lateral surfaces of the core 2.2 (e.g., not end faces of the core 2.2 at the input end 1.1 and output end 1.2). As nonlimiting examples, the reflective coating 2.1 may be made of a metal or of a dielectric coating or a Bragg coating. Materials for the metallic coating may be, for example, gold, silver and/or aluminum. In this way, the filaments 2 convey and retain the light within the filament 2. As the core 2.2 comprises a significant area of a cross-section 2.3 of the filament 2, transmission efficient of the light is greatly improved compared to conventional optical fibers. A convex envelope of a cross-section 2.3 of each filament 2 may be circular as shown in FIG. 1a. In alternative embodiments, the convex envelope of a cross-section 2.3 of each filament 2 may be configured in polygonal shapes, as shown in FIGS. 2a to 2c. As known by those skilled in the art of the present disclosure, the convex envelope defines convex polygon in which every line that does not contain any edge intersects the polygon in at most two points such that all interior angles are less than 180 degrees. For example, the convex envelope of the input end 1.1 shown in FIG. 1a is defined by the outermost tangents of the filaments 2 comprising the waveguide as arranged at the input end 1.1, not by the curved perimeter edges of each filament between contact points therebetween.

The number of filaments 2 is not limited to seven filaments. A person having ordinary skill in the art will adapt the number according to the needs of the contemplated implementation of the waveguide of the present disclosure. For example, with twelve additional filaments 2, a ring of filaments 2 at the input end 1.1 surrounding the central filament arrangement shown in FIG. 1a could be completed. The slit-like arrangement at the output end 1.2 may be formed by one column of filaments or more columns.

The filaments 2 may be held together and/or positioned by one or more frames. As shown in FIG. 1b, a first frame 4.1 may hold the filaments 2 at the input end 1.1, and a second frame 4.2 may hold the filaments 2 at the output end 1.2, each in the desired configuration.

FIGS. 2a to 2c show exemplary envelopes of cross-sections 2.3 of a waveguide 1 according to the present disclosure, in which advantages with respect to stackability are illustrated. In a first example shown in FIG. 2a, the filaments 2 may have a triangular shape. In that way, the input end 1.1 may be configured as a hexagon with good, efficient coverage of source light. At the output end 1.2, the filaments 2 may be configured slit-like by stacking each interlaced, side-by-side as shown on the right of FIG. 2a.

In the example as shown in FIG. 2b, the filaments 2 may have a square shape and can be configured in a roughly square or generally octagonal fashion, for example, at the input end 1.1. The output end 1.2 may again be configured linearly, for example, by an arrangement of the filaments 2 in a single column. FIG. 2c shows a configuration of filaments 2, whose envelope of cross-section 2.3 generally defines a hexagon. Similar to FIGS. 2a and 2b, the input end 1.1 may be configured to loosely follow a circular form, and the output end 1.2 linearly.

One advantage of the configurations, as shown in FIGS. 2a to 2c, is that the filaments 2 can be stacked against each other without any gaps in between, such that loss of the probe light entering the waveguide 1 at the input end 1.1 is minimized.

Figures 3A, 3B:
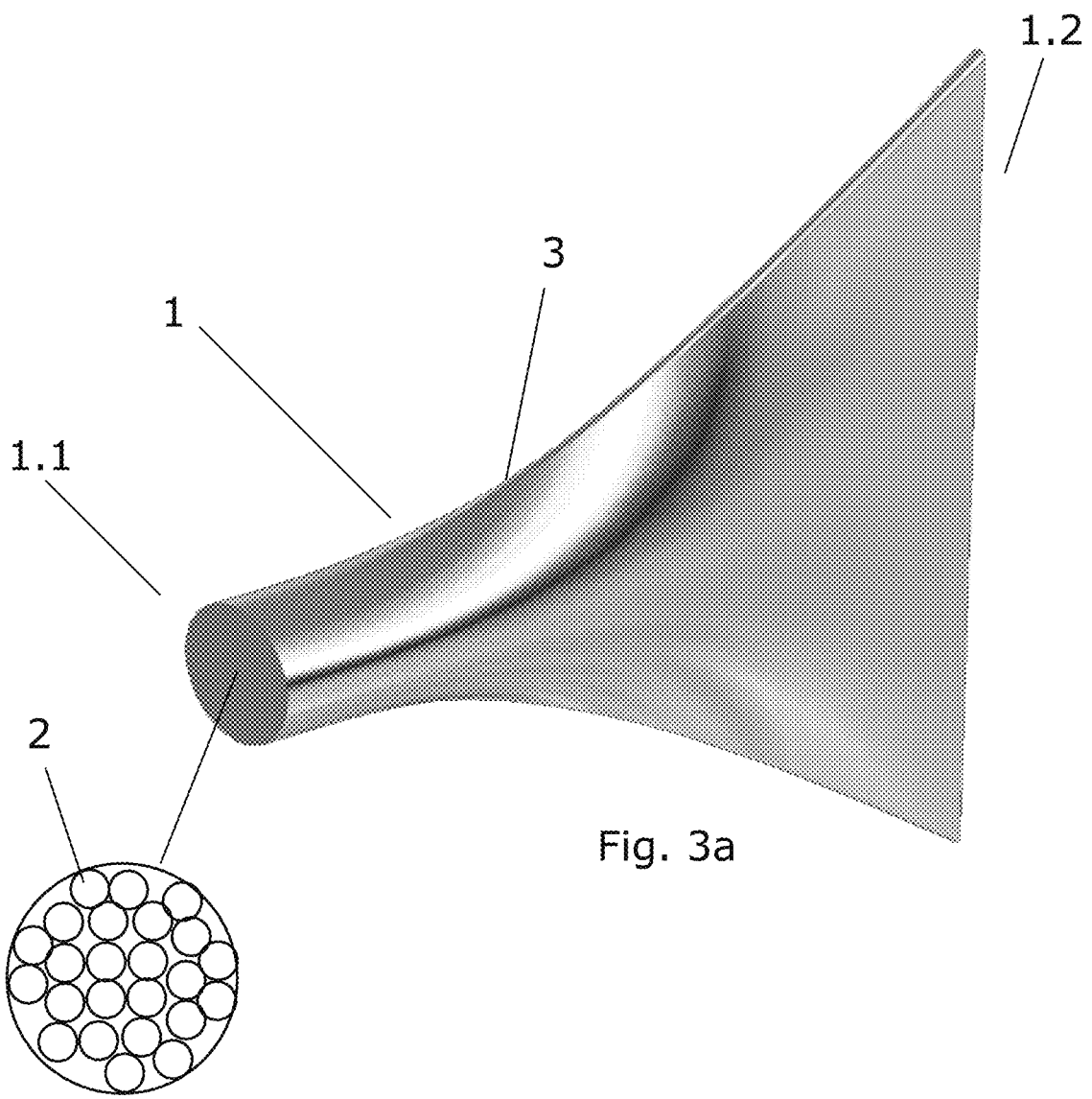

In an embodiment as shown in FIGS. 3a and 3b, the filaments 2 may be embedded in a shaping element 3, which shaping element 3 aids and defines a progression of the filaments 2 and of the cross-section of the waveguide 1 from the input end 1.1 to the output end 1.2. The filaments 2 and/or the shaping element 3 may be formed, for example, by additive manufacturing (e.g., 3D printing, fused deposition modelling, fused filament fabrication, selective laser sintering, selective laser melting, material and binder jetting processes). The filaments 2 in such a waveguide 1 are robust against external forces, such that transmission properties of the waveguide 1 remain very stable. As shown in FIG. 3b, a cross-section of the shaping element 3 includes a plurality of filaments 2.

Figure 4:
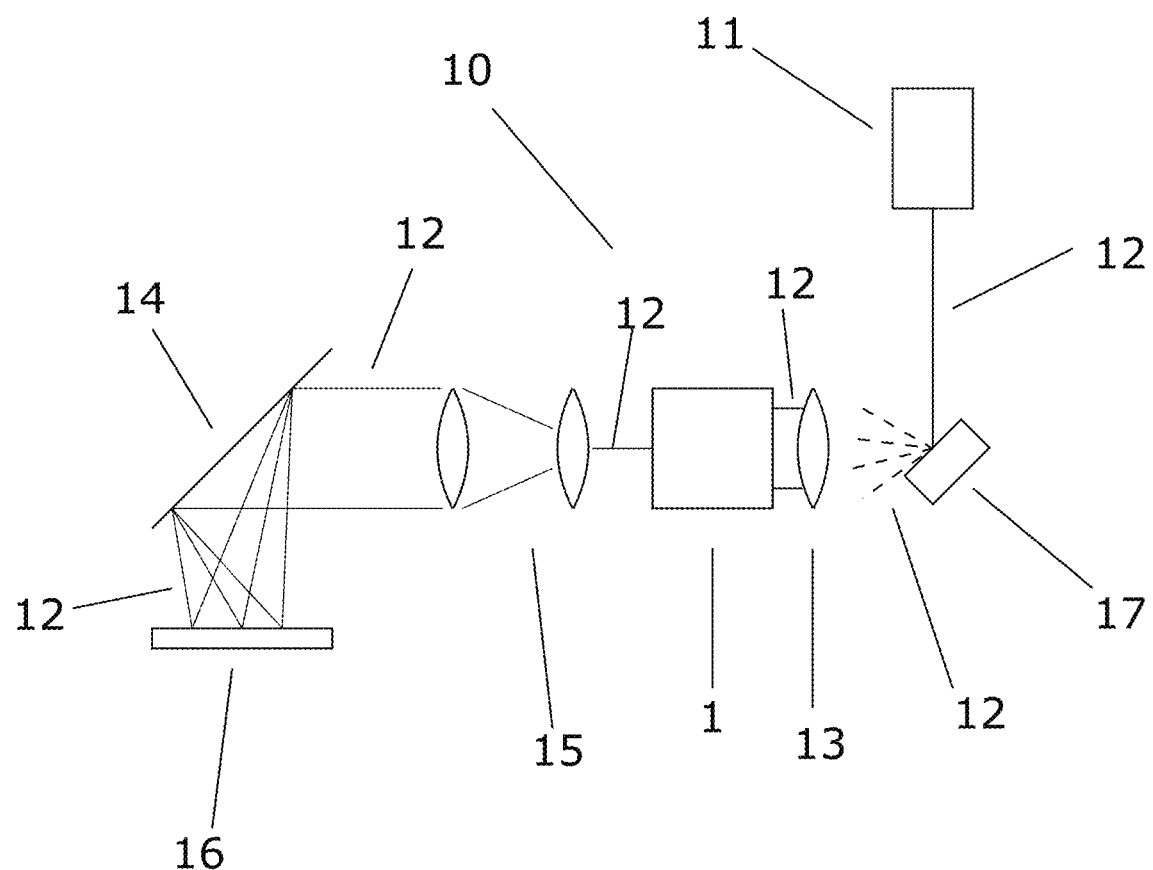
FIG. 4 shows a schematic of an electromagnetic spectrometer comprising a waveguide according to the present disclosure.

FIG. 4 illustrates an exemplary electromagnetic spectrometer, including a waveguide according to the present disclosure. As shown, the electromagnetic spectrometer 10 includes a light source 11 configured and arranged to illuminate a probe 17 with light 12. Light 12 being transmitting by the probe 17 is collected by a collector 13 and input in the waveguide 1 as described above. In at least one embodiment, the collector may be one or more optical lenses.

The waveguide 1 maps the collected light to a slit-like output which is collected and collimated by an optical arrangement 15. Such an optical arrangement 15 may comprise, as shown in FIG. 4, two lenses, a first one to diverge light output from the waveguide 1 and a second to collimate the diverging light and conveying the light onto a dispersive or diffractive element 14. The dispersive or diffractive element 14 may be, for example, a grating, a prism or such alike. The dispersive or diffractive element 14 separates the light 12 stemming from the probe 17 into its spectral components, such that the probe light can be interpreted by the detector 16.

In at least one embodiment, the spectrometer may be of a Raman type, for example, configured to perform Raman spectroscopic analysis.

The invention claimed is:

1. A waveguide of an electromagnetic spectrometer, the waveguide comprising:
a plurality of filaments, each configured to convey light from an input end to an output end thereof, wherein a first convex envelope of a cross-section of the waveguide at the input end defines a first shape, and wherein a second convex envelope of a cross-section of the waveguide at the output end defines a slit shape,
wherein each filament of the plurality of filaments comprises a core and a reflective coating covering a lateral area of the core, wherein the core comprises an optically transparent material, and wherein a cross-section of each filament defines a regular polygon with n2 corners, wherein n2 is 3, 4 or 6.

2. The waveguide of claim 1, wherein the first shape is a generally circular shape.

3. The waveguide of claim 1, wherein the first shape is a polygonal shape of a regular polygon with n1 corners, wherein n1 is a natural number larger than 3.

4. The waveguide of claim 1, wherein the reflective coating is metallic.

5. The waveguide of claim 4, wherein the reflective coating is at least one of gold, silver and aluminum.

6. The waveguide of claim 1, wherein the reflective coating is a dielectric or Bragg coating.

7. The waveguide of claim 1, further comprising:
a first frame configured to position the plurality of filaments at the input end to form the first convex envelope; and
a second frame configured to position the plurality of filaments at the output end to form the second convex envelope.

8. The waveguide of claim 1, wherein the output end has a length and a width, wherein the width is less than three diameters of any one of the filaments of the plurality of filaments.

9. The waveguide of claim 8, wherein at the output end the plurality of filaments are configured in a one-dimensional array.

10. The waveguide of claim 1, wherein the slit shape is linear.

11. The waveguide of claim 1, wherein the output end is configured to be optically connected with an optical lens, the optical lens having a lens refractive index, wherein a mean refractive index of the plurality of filaments differs from a mean of refractive index of air and the lens refractive index by less than 10%.

12. The waveguide of claim 1, wherein the output end is configured to be optically connected with an optical lens, wherein the optical lens has a lens refractive index, wherein a filament refractive index varies continuously along each filament of the plurality of filaments.

13. The waveguide of claim 1, wherein the plurality of filaments is embedded in a shaping element, which shaping element defines a progression of the waveguide from the input end to the output end.

14. The waveguide of claim 13, wherein the shaping element is fabricated by an additive manufacturing process.

15. The waveguide of claim 1, wherein each filament of the plurality of filaments is fabricated by an additive manufacturing process.

16. The waveguide of claim 1, wherein the optically transparent material of the core is a polymer, a glass or a crystal material.

17. A spectrometer comprising:
a light source adapted to illuminate a probe with light, wherein the light comprises a spectral line and a line width, wherein a ratio of the line width to a wavelength of the spectral line is less than 1/10000;
a collector configured to collect light emitted from the probe as probe light;
a waveguide according to claim 1;
a dispersive or diffractive element configured to separate the probe light into its spectral components;
a detector configured to detect the spectral components of the probe light; and
an optical arrangement comprising an optical lens and a collimating lens, wherein the optical lens is configured to diverge the probe light, wherein the collimating lens is configured to collimate the diverging probe light and to convey the diverging probe light to impinge upon the dispersive or diffractive element,
wherein the waveguide is configured and arranged to convey the probe light from the collector to the optical arrangement.

18. The spectrometer of claim 17, wherein the dispersive or diffractive element is a grating or a prism, and/or wherein the collector is one or more additional optical lenses.

19. The spectrometer of claim 17, wherein a convex envelope of a cross-section of each filament defines a rectangular polygon with n2 corners, wherein n2 is 3, 4 or 6,
wherein the first shape is a generally circular shape, or
wherein the first shape is a polygonal shape of a regular polygon with n1 corners, wherein n1 is a natural number larger than 3.

20. The waveguide according to claim 1, wherein the first shape is a regular polygon with 6 corners and the slit shape is a rectangular polygon with 4 corners.

* * * * *